United States Patent Office 3,792,176
Patented Feb. 12, 1974

3,792,176
METHOD FOR MAKING PASTRY DOUGHS
Eric M. Van Patten, Tinley Park, and Dale H. O'Rell and Leonard B. Kondrot, Chicago, Ill., assignors to American Maize-Products Company
No Drawing. Filed Mar. 2, 1972, Ser. No. 231,415
Int. Cl. A21d 2/00, 8/00
U.S. Cl. 426—157     5 Claims

ABSTRACT OF THE DISCLOSURE

An improved dough for nonleavened pastries, especially fruit and meat pies, is disclosed. By the addition of from about 1% to about 10% of an unmodified high amylose starch, the pastry dough is made more easy to process and in addition the crusts do not become soggy when baked out.

---

The present invention relates to a new and useful nonleavened pastry dough which is especially useful for making pie crusts for both fruit and meat type pies. In the production of pie doughs for fruit and meat type pies, a number of problems have been encountered. One of these is that the dough is quite sticky and requires an appreciable amount of dry dusting flour on its outer surface to put it into workable condition for either mechanical or hand shell forming. The use of dusting starches is messy and inconvenient and often detracts from the finished baked out quality of the pie crusts. A second problem encountered is that the crusts are often soggy because they absorb excessive amounts of the fruit or meat filling when they are baked out. An additional problem is that crusts made from standard pie dough are often tough and lack the desired flaky texture.

One solution that has been proposed in the past is to use a carefully selected flour blend that possesses a specific protein content. Pie doughs made with this carefully selected flour blend will normally have good properties when the dough-making procedure is controlled within carefully established boundaries. While this approach has been somewhat successful, it greatly increases raw material costs and also increases processing costs since rigid manufacturing controls must be employed.

It has now been discovered that the addition of an unmodified high amylose starch to the pie dough eliminates the problems hereinbefore encountered without substantially increasing raw material costs and without the need for rigid manufacturing controls. A standard unleavened pie dough comprises flour, water and shortening. Sugar, salt and other flavorings are usually added. According to the present invention, there is added to the standard pie dough from about 1% to about 10% by weight of flour of an unmodified high amylose starch having an amylose content of at least about 50%. By the term "unmodified" it is meant that the high amylose starch has not undergone any further chemical or physical treatment to change the basic properties of the refined native starch.

We have quite surprisingly discovered that when the unmodified high amylose starch is added to the pie dough, the dough can be worked or formed with less dusting starch than is normally required and frequently can be worked and formed with no dusting starch. In addition, the bake out pie crust has superior textural qualities and is considerably less soggy than standard fruit and meat type pies. Furthermore, the addition of the unmodified high amylose starch adds structural strength to the baked out pie crust without a corresponding decrease in tenderness.

Unleavened pastry doughs especially useful for making fruit and meat type pies generally comprise the following ingredients per 100 parts flour:

| | Parts |
|---|---|
| Flour | 100 |
| Shortening | From about 30–70 |
| Water | From about 20–65 |

Salt and sugar and other flavorings are also frequently added. By the term "shortening" it is intended to mean a non-toxic edible fat useful for cooking.

In accordance with the present invention there is added to the above formulation from about 1% to about 10% by weight of flour of an unmodified high amylose starch. The high amylose starch may be added by admixing the flour, shortening and high amylose starch together and then adding the water. However, it is recommened that the flour and shortening be admixed and that the high amylose starch be added with the water as a starch slurry.

For best results in accordance with the present invention, the unleavened pastry dough is especially useful for making fruit and meat type pies comprising the following ingredients per 100 parts flour:

| | Parts |
|---|---|
| Flour | 100 |
| Shortening | From about 35–55 |
| Water | From about 35–45 |
| Unmodified high amylose starch | From about 2–5 |

Salt, sugar and other ingredients may be added as desired.

In order to demonstrate the improvement of the present invention, the examples all employ the following basic ingredients per 100 parts of flour:

| | Parts |
|---|---|
| All purpose flour | 100 |
| Lard (shortening) | 52.5 |
| Salt | 4.2 |
| Water | 46.3 |
| Dextrose (sugar) | 2.3 |

EXAMPLE 1

Using a small Hobart mixer, the flour and lard were blended until no individual pieces of lard were larger than the size of a pea. The salt and sugar were admixed with the water and this slurry was then added to the flour and lard blend. The admixture of salt, sugar, water, flour and lard was mixed for five minutes. Thereafter, the dough was formed by hand for use in a pie having a fruit filling. Large amounts of dusting flour were required to properly shape the dough. After the dough was shaped, the fruit filling (specifically cherry) was added and thereafter a top piece of dough was affixed to the pie. The pie was then frozen at −5° F. for seven days. On the seventh day the pie was removed from the freezer and placed directly in an oven at 425° F. The pie was cooked for fifty minutes.

EXAMPLE 2

Example 1 was repeated except that 5.25 parts of Amylomaize VII was added to the water before the water and flour/lard blend were admixed. Amylomaize VII is an unmodified high amylose starch containing 70% amylose and is available from American Maize-Products Company. When the dough was formed into a pie, considerably less dusting flour was required than in Example 1.

The pie was then frozen, stored and baked as in Example 1. The finished pie of this Example was then compared with the finished pie of Example 1 and the data is summarized below:

| Example: | Structural strength | Crispness | Uniformity |
|---|---|---|---|
| 1 | Fair | Poor | Fair |
| 2 | Good | Good | Good |

It was additionally noted that the bottom of the pie crust of Example 1 was considerably more soggy than the bottom of the pie crust of Example 2.

EXAMPLE 3

Example 2 was repeated except that 10.5 parts Amylomaize VII were used instead of 5.25 parts of Amylomaize VII. A comparison of this pie crust with the pie crust of Example 1 is summarized below:

| Example: | Structural strength | Crispness | Uniformity |
|---|---|---|---|
| 1 | Fair | Poor | Fair |
| 3 | Excellent | Excellent | Excellent |

It was additionally noted that the bottom of the pie crust of Example 1 was considerably more soggy than the bottom of the pie crust of Example 3.

EXAMPLE 4

Example 2 is repeated except that 1.0 parts of an unmodified high amylose starch having an amylose content of 50% was substituted for the 5.25 parts of Amylomaize VII. Comparable results to those of Example 2 are obtained.

EXAMPLE 5

Example 2 is repeated except that 12 parts of unmodified pure amylose are substituted for the 5.25 parts of Amylomaize VII. In a comparison of this pie crust with the pie crust of Example 1 comparable results are obtained to those given in Example 3.

EXAMPLE 6

Example 2 is repeated except that the 5.25 parts of Amylomaize VII were admixed with the shortening and flour and then the water with the salt and dextrose is admixed therewith. A comparison of this pie crust with the pie crust of Example 1 gives comparable results to those obtained in Example 2.

EXAMPLE 7

Example 2 is repeated except that a standard beef and gravy pot pie filling is used instead of the fruit filling. A comparison of the pie crust with the pie crust of Example 1 gives results comparable to those of Example 2.

EXAMPLE 8

Example 7 is repeated except that the pie dough is mechanically formed by sheeting and formed to pie pan size. Comparable results are obtained. It was additionally noted that machineability of the pie dough was noticeably improved and the pie dough containing the Amylomaize VII require about 25% less dusting flour for proper sheeting than did the pie dough containing no high amylose starch.

It will be understood that the claims are intended to cover all changes and modifications of the preferred embodiments of the invention, herein chosen for the purpose of illustration, which do not constitute departures from from the spirit and scope of the invention.

What is claimed is:

1. A nonleavened pastry dough especially useful in the formation of fruit and meat type pie crusts consisting essentially of per 100 parts flour:
    (a) 100 parts flour;
    (b) from about 30 parts to about 70 parts shortening;
    (c) from about 20 parts to about 65 parts water; and
    (d) from about 1 part to about 10 parts of an unmodified high amylose starch containing at least about 50% amylose.

2. The nonleavened dough of claim 1 wherein the high amylose starch contains at least about 70% amylose.

3. A nonleavened pastry dough especially useful in the formation of fruit and meat type pie crusts consisting essentially of per 100 parts flour:
    (a) 100 parts flour;
    (b) from about 35 parts to about 55 parts shortening;
    (c) from about 35 parts to about 45 parts water; and
    (d) from about 2 parts to about 5 parts of an unmodified high amylose starch containing at least about 50% amylose.

4. The nonleavened dough of claim 3 wherein the high amylose starch contains at least about 70% amylose.

5. The pastry dough of claim 3 further including salt and sugar as flavorings.

References Cited

UNITED STATES PATENTS 3,541,587  11/1970  Washburn _____ 99—88
3,615,684  10/1971  Workin _____ 99—94

RAYMOND N. JONES, Primary Examiner